US006496101B1

(12) United States Patent
Stillwagon

(10) Patent No.: US 6,496,101 B1
(45) **Date of Patent: *Dec. 17, 2002**

(54) ELECTRO-MECHANICAL LATCH ASSEMBLY

(75) Inventor: Woodrow C. Stillwagon, Atlanta, GA (US)

(73) Assignee: Star Lock Systems, Inc., Hilliard, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/372,195

(22) Filed: Aug. 11, 1999

Related U.S. Application Data

(63) Continuation-in-part of application No. 09/372,525, filed on Aug. 11, 1999.
(60) Provisional application No. 60/096,251, filed on Aug. 12, 1998.

(51) Int. Cl.$^{7}$ .................................................. H04Q 3/00
(52) U.S. Cl. ........................ 340/5.61; 340/5.7; 340/5.9; 70/278.7
(58) Field of Search ....................... 340/825.31, 825.69, 340/542, 825.72, 545, 5.6, 5.61, 5.7, 5.73, 5.9; 292/252, 201, 341.17; 70/278, 231, 277, 278.1, 278.2, 278.7; 235/382.5; 361/172

(56) References Cited

U.S. PATENT DOCUMENTS 1,499,444 A 7/1924 Caillois
2,727,772 A 12/1955 Hamilton .................... 292/144
3,753,316 A 8/1973 Savarieau et al. ............. 49/31
3,994,521 A 11/1976 Van Gompel ............... 292/319
4,031,434 A * 6/1977 Perron et al. ............... 361/172
4,196,347 A 4/1980 Hadley ....................... 359/147
4,207,555 A * 6/1980 Trombly .................. 235/382.5
4,438,962 A 3/1984 Soloviff et al. ............. 292/144
4,637,234 A 1/1987 Mielonen ....................... 70/34
4,663,952 A 5/1987 Gelhard ...................... 70/278.2
4,900,182 A 2/1990 Stillwagon .................. 403/325
4,937,560 A 6/1990 Nourmand .................. 340/542
5,027,630 A 7/1991 Stillwagon et al. ........... 70/391
5,140,317 A 8/1992 Hyatt, Jr. et al. ....... 340/825.31
5,141,355 A 8/1992 Stillwagon .................. 403/325
5,392,025 A 2/1995 Figh et al. .................. 340/545
5,467,619 A 11/1995 Stillwagon ..................... 70/34
5,479,799 A * 1/1996 Kilman ........................ 70/231
5,575,515 A * 11/1996 Iwamoto ................ 292/341.17
5,636,881 A 6/1997 Stillwagon .................. 292/150
5,712,626 A 1/1998 Andreou et al.
5,746,458 A 5/1998 Fisher ........................ 292/252
5,813,257 A 9/1998 Claghorn et al. ............. 70/208
6,005,487 A 12/1999 Hyatt, Jr. et al.
6,068,305 A * 5/2000 Myers ........................ 292/201

* cited by examiner

*Primary Examiner*—Edwin C. Holloway, III
(74) *Attorney, Agent, or Firm*—Womble Carlyle Sandridge & Rice, PLLC

(57) ABSTRACT

An electro-mechanical latching apparatus for an enclosure such as a vending machine and including an electronic lock controller for disengaging a latch assembly securing the door of the enclosure against the enclosure frame in a closed, locked position. Upon actuation, the lock controller disengages the latch assembly and enable the door of the enclosure to be moved to an open position for accessing the enclosure.

24 Claims, 9 Drawing Sheets

ELECTRO-MECHANICAL LATCH ASSEMBLY

CROSS REFERENCE TO RELATED APPLICATION

This application is a continuation-in-part of U.S. patent application Ser. No. 09/372,525, filed Aug. 11, 1999 and claims the benefit of U.S. Provisional Application Serial No. 60/096,251, filed Aug. 12, 1998.

TECHNICAL FIELD

The present invention relates generally to latching and locking devices. In preferred embodiments, the present invention more specifically relates to electronic latching and locking devices such as for use with vending machines and similar enclosures.

BACKGROUND OF THE INVENTION

Latching or locking devices commonly are used to hold lids, doors or other closure elements of boxes, cabinets, doorways and other framed structures in closed and/or locked positions, and further typically are used to provide some measure of security against unauthorized or inadvertent access. For example, conventional vending machines generally include a key operated latch or locking device that typically includes a latching assembly and a post mounted to the frame and door of the vending machine so that the door of the vending machine is automatically locked when moved into a closed position against the machine frame by the insertion of the post into the latching assembly. Such latching assemblies further typically include a housing that defines an axial passage in which the post, often attached to and/or operating in conjunction with a T-handle, is received and is engaged by latch elements that are biased into contact with a surface of the post. The latch elements grip the post and preclude its withdrawal from the axial passage of the latch housing.

Typically, to disengage the latching assembly from the post, these latching assemblies utilize key locks in which a key is received, and, as the key is turned, the biased latching elements of the assembly are released from engagement with the post to enable the door or other closure element to which the latch is mounted to be opened. Examples of such latching assemblies for use with vending machines or similar enclosures are disclosed in U.S. Pat. Nos. 5,050,413, 5,022,243 and 5,467,619. Such an unlocking or opening operation generally is a substantially manual operation such that most latching assemblies generally are limited in their placement to regions or areas where they can be readily reached and operated, i.e., in the middle of the door. Such easy access to these latching assemblies, however, tends to make these latching assemblies easy targets for vandals or thieves can shield their actions from view while attacking the security of the enclosure by picking or smashing the lock to remove the primary and sometimes only point of security between the door and the frame of the enclosure.

In particular, vending machines have become an increasingly favorite target of vandals and thieves. The popularity of vending machines has greatly increased in recent years, especially in remote areas for providing ready access to an increasing variety of goods including food and drinks, stamps, and higher priced items such as toys and cameras, all without requiring human intervention. At the same time, the capacities of conventional vending machines have increased significantly so as to not only provide consumers with more choices, thus creating more opportunities for sales, but further to decrease the amount of servicing or restocking that is required for the vending machines. For example, the typical soft drink vending machine has increased in capacity from approximately 420 cans to approximately 800 cans. The increased popularity and increased capacity of vending machines as well as the expansion of products to higher priced items have significantly increased the amounts of money taken in by vending machines, providing an increasingly attractive target to thieves and vandals. Further, if the key to one of these latching assemblies or locking devices is lost or stolen, all the locks accessible by such key must be "re-keyed" to maintain controlled access and security. Such re-keying is typically burdensome and very costly, especially where there are a significant number of locks that need to be re-keyed. Accordingly there is an increasing interest in improving the security of latching and locking assemblies for securing the doors or other closure devices of vending machines and similar enclosures.

There also exists a problem of monitoring and auditing the amount of time required for a service technician to access and service devices such as vending machines, automatic teller machines, gambling machines or other automated kiosks or containers. It is therefore difficult for many companies to develop a good schedule or concept of the total time required to service such vending devices or machinery to better plan service routes and/or allocate or assign service technicians. This problem is further compounded by conventional latching systems that require the post of the latch to be rotated through multiple revolutions to fully release it from the latch assembly. Such additional time required to disengage and open the latching assembly may seem small per individual machine, but constitutes a significant expenditure of time that can be burdensome, for example, for a company that has a large number of vending machines that must be serviced, by significantly increasing the amount of time required to service each particular vending machine.

There is, therefore, a need for improved latching systems and methods that address these and other related and unrelated problems.

SUMMARY OF THE INVENTION

Briefly described, the present invention generally comprises an electromechanical latching apparatus or system for securing a door or other closure device for enclosures such as vending machines, trailers, etc. The latching apparatus of the present invention is designed to provide enhanced security for the enclosure and to additionally provide for data collection and transfer of information to enable more accurate tracking of stocking information and service time. Typically, the enclosure to which the electro-mechanical latching apparatus of the present invention is applied will include an enclosure frame and at least one door hingedly attached to the enclosure frame so as to be movable between an unlocked, open position displaced from the enclosure frame and a closed, locked position secured against the enclosure frame.

The electro-mechanical latching apparatus generally includes a mechanical latch or lock assembly and an electronic lock control system or mechanism. The mechanical latch assembly secures the door against the enclosure frame and is disengaged or actuated remotely through the electronic lock control system.

The electronic lock control system or assembly is generally mounted on the inside of the door of the enclosure and controls the operation of the solenoid for disengaging or releasing the handle assembly from its depressed, locked position to enable unlocking and thus opening of the door of the enclosure. The electronic lock control system preferably generally includes an electronic lock controller and a data/power link or transceiver mounted to the front of the door. Typically, the lock controller includes a microprocessor and memory for storing data or information such as when and how long the door has been opened and by whom, a capacitor and a relay switch. The data/power link typically comprises an inductive coupling such as ferrite coil which enables indirect power transfer inductively through the door over a desired air gap. A data transfer thereafter is accomplished through electromagnetic dynamics, radio frequency transfer or an infrared link. The data/power link is connected to the electronic controller for providing a transfer of power and data to the electronic lock controller.

A hand held key controller provides power and data signals and commands to the electronic lock controller via the data/power link mounted to the door. The key controller typically will have a mating data/power link, i.e., inductive ferrite coil, a power supply such as a battery, and typically includes a display such as a touch screen or a LCD screen and key-pad for entry and review of data to be transferred to and received from the electronic lock controller through the data/power link. As the key controller is actuated, it transmits power and data signals through the door to the data/power link, which communicates these power and data signals to the lock controller to power the controller and identify the key controller. Upon verification of the key controller personal identification number (PIN) and that the key controller is authorized to access the enclosure, programming updates and/or other data are transferred between the key controller and the lock controller. Thereafter, the lock controller sends a signal or pulse to an actuator for the mechanical latch assembly to energize and cause the latch assembly to disengage and allow the user or operator to unlock and open the door.

The mechanical latching assembly generally comprises a post latching assembly including a post mounted to the door of the enclosure and a latch mounted to the enclosure frame in a position to receive the post in locking engagement therein as the door is moved into its closed position against the enclosure frame. Generally, the post will include an elongated rod having a first end attached to the door and a second or distal end in which a notch is formed for engagement with the latch. In a first embodiment of the post latching assembly, the notch portion of the post is formed as a recessed area having a clamping surface or portion adjacent its second, distal end that is received within the latch. The latch includes a latch housing having an axial passage in which the distal end of the post is received, and a detent assembly mounted within the housing. The detent assembly typically includes a pair of holding balls that, in an operative position, are received and project into the axial passage of the housing, and a pair of back stop balls positioned adjacent the holding balls and which urge and maintain the holding balls in their operative position projecting into the axial passage. Biasing elements such as compression springs tend to urge the back stop balls against the holding balls to urge the holding balls laterally into their operative, locking position projecting into the housing for engaging the post.

An actuator, such as a solenoid, is mounted to the housing by a plunger which raises and lowers the solenoid with respect to the housing as the solenoid is actuated. A pusher pad is mounted adjacent the plunger and supports lift pins that are received within and move along the latch housing. As the solenoid is actuated and the pusher pad raised toward the latch housing, the lift pins urge the back stop balls upwardly against their biasing elements to release the holding balls from their locking engagement with the clamping surface of the post. A locking post further is received within the housing and is mounted to the pusher pad of the solenoid. In an operative position, the locking post engages the clamping portion of the post to further lock the post within the latch housing. As the pusher pad is raised with the actuation of the solenoid and the holding balls are released from their engagement with the post, the locking pin likewise is moved out of engagement with the post to enable the post, and thus the door to be moved to an open position.

In an additional embodiment of the post latching assembly of the present invention, the post typically will be formed with a square notch formed in adjacent the second or distal end of the post. The latch generally includes a housing having an axial passage formed therein in which the distal end of the post is received, and a retaining element that is biased into an engaging position projecting into the axial passage in a position to engage and be received within the square notch of the post. The retaining element typically comprises a bar biased into its lowered, engaging position by a biasing element such as a compression spring. An actuator such as a solenoid is connected to the housing by a plunger which raises and lowers the solenoid with respect to the housing as the solenoid is actuated. A pusher pad is mounted to the solenoid and supports a pair of lift pins that are moved upwardly through the housing as the solenoid is raised. The lift pins engage and urge the ends of the locking bar or retaining element upwardly against the biasing force of the compression spring so as to raise the locking bar out of engagement with the notch portion of the post to release the post from the latch and enable the door to be moved into its open position.

After the operator performs the desired tasks/operations for the enclosure, the operator enters any additional data or programming information such as repair or work orders for the machine or stocking information into the key controller and thereafter closes and locks the door. The information stored in the key controller, such as the amount of stock input into a certain vending machine or machines, the service time required to service a machine, or a repair order, will be downloaded from the key controller to a central server or computer at the operator's plant or base of operations for generation of reports and analysis of service data. The key controller further can be reprogrammed with new or additional route information, including a different PIN or identification numbers or other programming information as well as charging of the power source for the key controller.

Various objects, features and advantages of the present invention will become apparent to those skilled in the art upon reading the following detailed description, when taken in conjunction with the accompanying drawings.

DETAILED DESCRIPTION OF THE PREFERRED EMBODIMENTS

Figure 1:
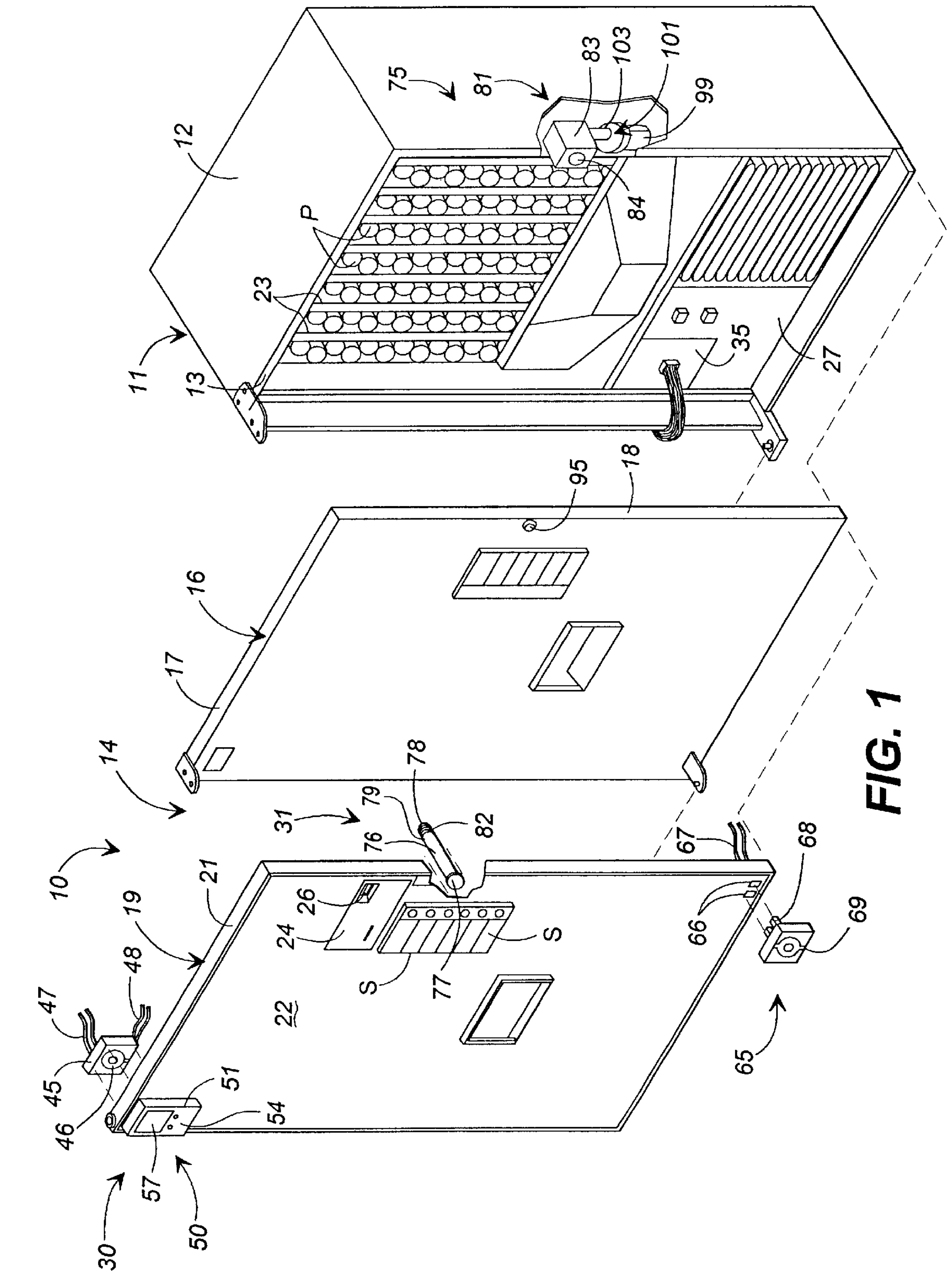
FIG. 1 is an exploded perspective view of the present invention of an electromechanical latching apparatus as applied to a vending machine in an exemplary embodiment.
Figure 2:
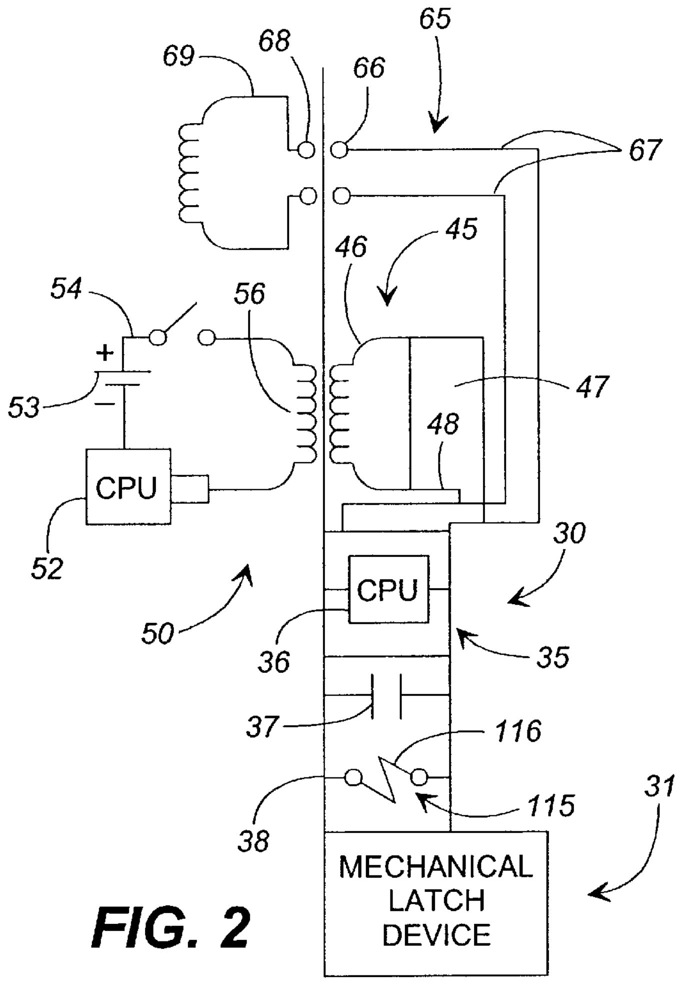
FIG. 2 is a schematic illustration of the circuit for a first embodiment of the lock control assembly of the present invention.

Referring now to the drawings in greater detail in which like numerals indicate like parts throughout the several views, FIGS. 1–3 illustrate an electromechanical latching apparatus 10 for locking or securing and thus restricting access to an enclosure, as illustrated at 11 in FIG. 1, and which further enables recording and transfer of information and data between a control system for the enclosure and an operator key or control unit, such as who accessed the enclosure and at what times, and stocking data, etc. The enclosure 11 is generally illustrated in FIG. 1 as a vending machine such as a soft drink machine, for purposes of illustration. It will, however, be understood by those skilled in the art that the electromechanical latching apparatus 10 of the present invention can be applied to various types of enclosures including vending machines, automated teller machines, cabinets, storage units and other, similar types of enclosures.

Typically, the enclosure 11 will include a cabinet or body 12, frame 13 and a door assembly 14 hingedly attached to the frame so as to be movable between an unlocked, open position and a locked, closed position secured against the enclosure frame. In the case of a vending machine, as illustrated in FIG. 1, the door assembly typically will include an inner door 16, typically formed from an insulating material such as a foam material and having an outer frame 17 with a sealing gasket 18 formed from a flexible sealing material applied there about, and an outer door 19 which includes an outer frame 21 surrounding a door panel 22 that is formed from a somewhat translucent, durable plastic material such as LEXAN® and typically is inprinted with a design such as a product design or name, or which can be substantially transparent to enable viewing of the product contained within the enclosure. It will also be understood that a single door assembly, comprising a single door with spaced front and rear panels and a door frame, also can be used in place of the multiple door assembly illustrated in FIGS. 1 and 2. Further, in the case of a vending machine, the machine/enclosure generally will include product racks 23 for storing and supporting products P, such as soft drinks or other food items, a motor M for selecting and dispensing the products, a selector pad assembly S through which users can input desired product selections, and a coin or money reader 24 with a cash box 26 for receipt of monies for the selected products. The enclosure also typically will include a machine control 27 connected to an external power source, for processing user product requests and controlling the dispensing of products from the machine/enclosure.

The electromechanical latching apparatus 10 generally includes an electronic lock control system 30 mounted to the inner surface of outer door 19 and a mechanical latch or lock assembly 31 mounted to the outer door 19 and frame 13 of the enclosure 11, as illustrated in FIGS. 1 and 2, for securing the doors in their locked position against the frame. The electronic lock control system communicates with and actuates or controls the mechanical latch assembly 31 for actuating or disengaging the latch assembly 31 to enable the inner and outer doors to be released and moved from their locked position against the frame 13 to their unlocked, open position for access to the enclosure cabinet.

As illustrated in FIGS. 1–3, the electronic lock control system 30 generally includes an electronic lock controller 35 (FIGS. 1 and 2) typically mounted within the enclosure 11. The lock controller 35 generally includes a processor 36 (FIG. 2) such as a 64 to 128 bit microprocessor chip or board having internal memory and a clock, a capacitor 37 for storing power and generating a 40–50 volt DC pulse for activation of an actuator 115 of the latch assembly 31, and a relay 38 for transmitting power to and triggering the actuator. The lock controller generally is not directly connected to a direct power source such as a power outlet as is the machine controller 27 (FIG. 1), but instead is designed to receive and be powered from an indirect power source. The lock controller communicates with the machine controller to transmit program updates and other information to the machine controller and receives data or information from the machine controller as to the operation of the enclosure such as a vending machine.

A data/power link 45 is connected to the lock controller for supplying power and control signals or instructions to and transmitting data from the lock controller. The data/power link generally includes an inductive coupling 46 such as a ferrite coil, typically 40–50 mm in diameter by approximately 25–30 mm in thickness, such as manufactured by MAGNETICS®. In addition, the data/power link includes a transceiver for receiving and sending data signals by electromagnetic dynamics, or could include a radio frequency (RF) link or an infrared link primarily for use with a substantially transparent outer door panel. The data/power link is mounted on the rear or inner face of the panel 22 of the outer door 19 as shown in FIG. 1, typically positioned in the upper left hand corner adjacent the door frame, and facing outwardly so as to position the data/power link in a fixed location for ease of locating. The data/power link 45 generally includes two sets of leads 47 and 48 that are connected to the lock controller 35. One set of leads 47 transmits power received through the data/power link to the lock controller, while the other set of leads 48 transmits data received through the data/power link to the lock controller.

Figure 3A:
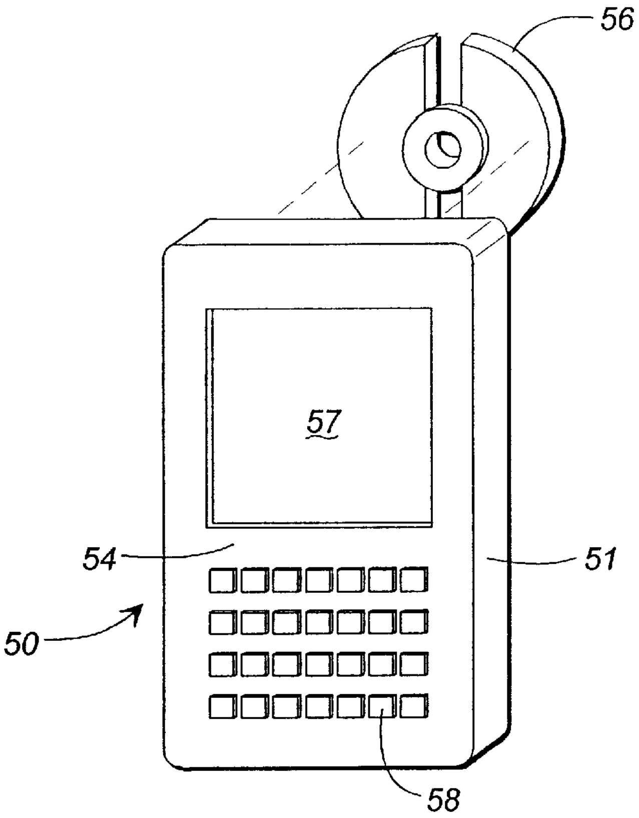
FIG. 3A is a perspective illustration of a first embodiment of the key controller.
Figure 3B:
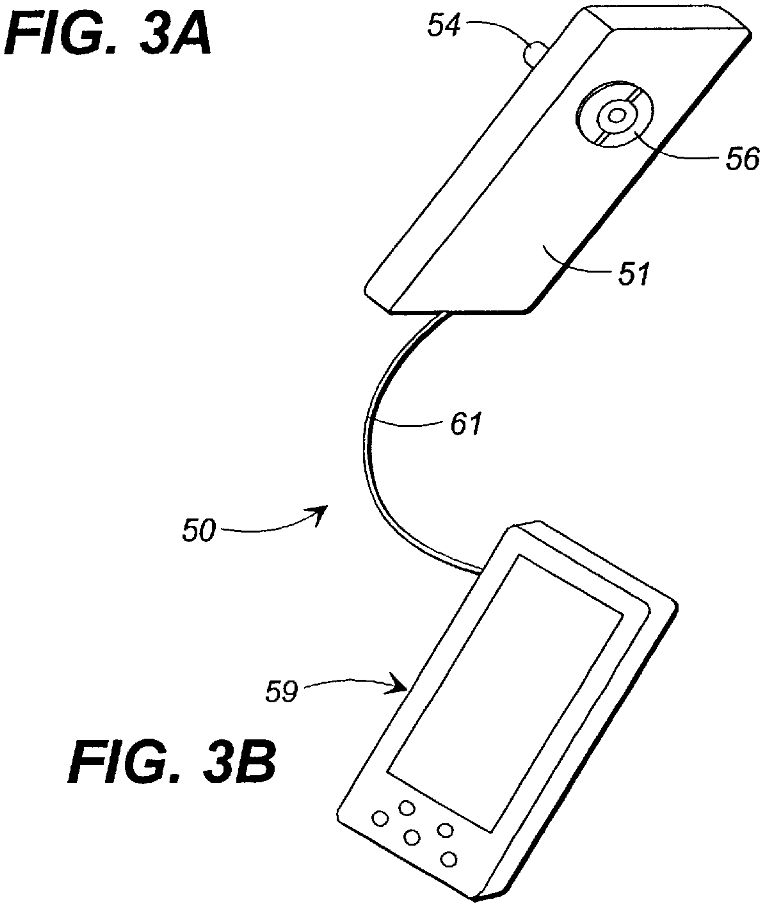
FIG. 3B is a perspective illustration illustrating a second embodiment of the key controller.

A key controller 50 is provided for inductively transmitting power and control instructions or signals through the door(s) of the enclosure to the lock controller via the data/power link and for receiving data and operational information from the lock controller. The key controller 50 (FIGS. 3A and 3B) typically is a hand held unit which includes a housing 51, a processor chip 52 such as a 64 to 128 bit microprocessor, a power source 53 such as a 9 volt battery that typically is rechargable or which enables a connection to an AC outlet or other external power source, a switch 54, and a matching inductive coupling or link 56 that matches the inductive coupling of the data/power link. For example, if the data/power link includes a ferrite coil inductive coupling 46, the key controller typically will include a matching ferrite coil. The key controller is aligned with the data/power link and transmits power to the data/power link and thus to the lock controller. Thereafter, once the data/power link has been energized, data is transferred by electromagnetic dynamics, between the key controller and the data/power link through the door(s) of the enclosure through inductive transfer, or if an RF or infrared link is used, through radio frequency or infrared signals to indirectly power and communicate with and/or program the lock controller. As illustrated in FIGS. 1 and 3A, the key controller further includes a display 57 through which programming and data/information received from the lock controller can be reviewed by an operator. The key controller also generally includes an input mechanism such as a key pad 58 (FIG. 3A) or can use a touch screen for the display 57. Further, as illustrated in FIG. 3B, the key controller can include a connection to a hand held PC, used in place of the touch screen and key pad for the controller 59, such as a PALM PILOT® or similar hand held personal computing unit, and connected to the key controller by a lead or connection 61.

Figure 4A:
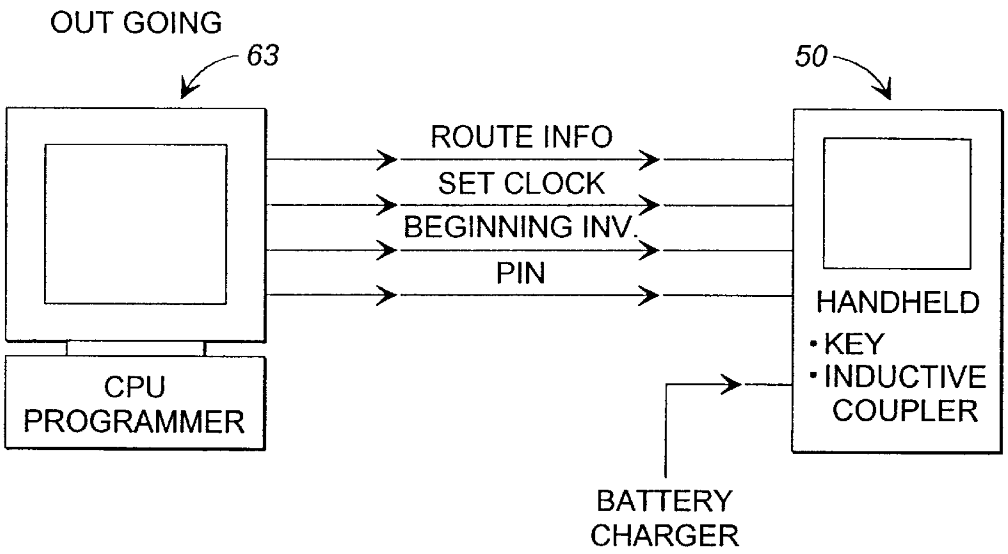
FIG. 4A is a schematic illustration of the programming of the key controller.
Figure 4B:
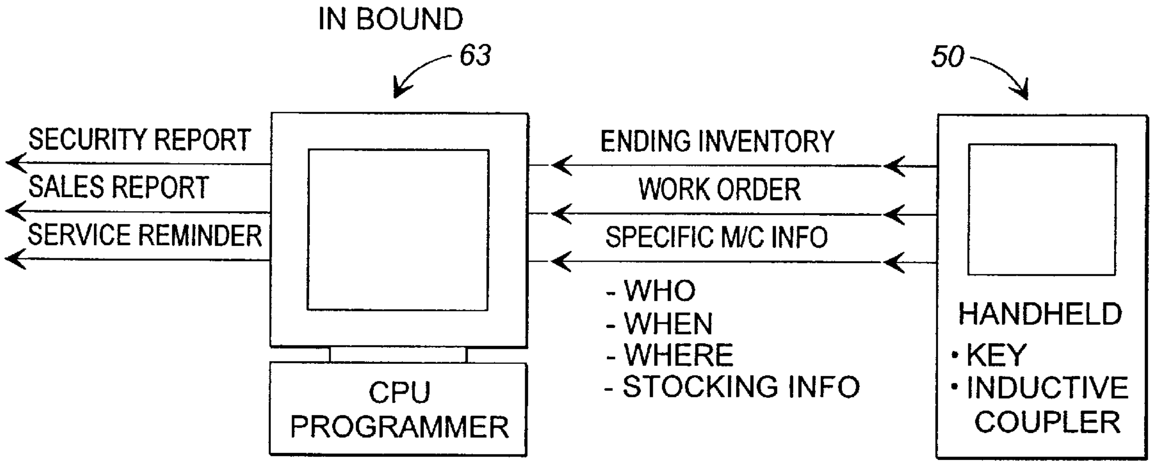
FIG. 4B is a schematic illustration of the downloading of information from the key controller to a central processor or server for the preparation of reports.

The hand key controller unit typically is programmed through a central processing unit or server computer 63 (FIG. 4A) at the operator's base of operations. The key controller is typically programmed with data/information such as route information and a personal identification number or code that can be set to authorize access to only certain types or groups of vending machines, and its internal clock is set to match the internal clock of the lock controller of the machines/enclosures to be accessed by the key controller as indicated in FIG. 4A. In addition, the key controller typically is programmed with program instructions for downloading to the lock and machine controllers during accessing of the lock controllers. For example, program instructions can be included in the key controller to set operating times for a vending machine such that the machine will only allow access and operation for dispensing products during a certain prescribed time interval such as during school lunch hours for vending machines located at school cafeterias. The internal power source, i.e., battery, of the key controller also is typically fully charged and can be reprogrammed on a regular basis such as on a daily or weekly basis as needed. As indicated in FIG. 4B information received and stored in the key controller from the machines accessed thereby also generally will be downloaded to the server 63 from the key controller for generating reports and monitoring the servicing of the machines.

In addition, a secondary or back door access control 65 typically is provided adjacent a lower edge of the door assembly. The secondary or back door access control generally includes a pair of connectors 66 (FIG. 1) mounted to and accessible beneath the outer door of the door assembly and which are connected to the lock controller via leads 67. The connectors typically are female connectors that receive mating male connector leads 68 from a spare inductive coil or power link 69 as illustrated in FIG. 3 to transmit power to the key controller and to the lock controller 35. If the primary data/power link 45 malfunctions or becomes disengaged from the inner door and thus it is not possible to transmit power and data signals to the lock controller through data/power link 45, the spare inductive power link can be connected to the lock controller via the connectors and leads of the secondary or back door control access to providing power to the lock controller for actuation of the solenoid of the mechanical latch assembly to cause the release of the mechanical latch assembly and enable opening of the door assembly for the enclosure.

Figure 7:
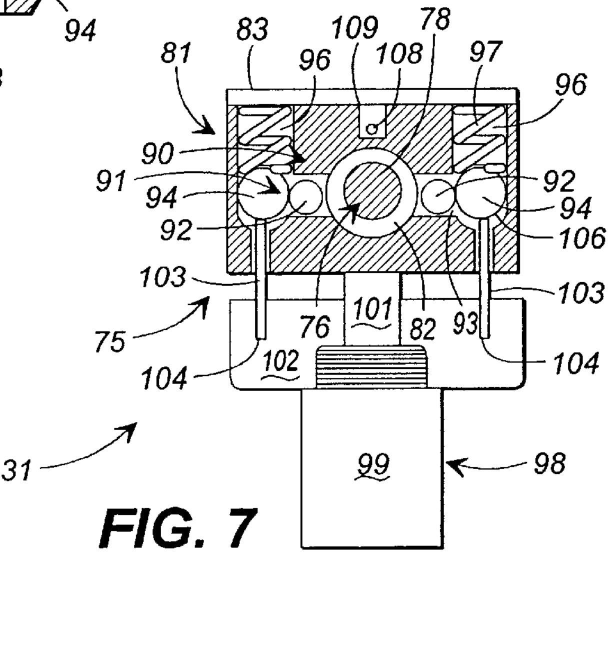
FIG. 7 is an end view taken in partial cross section of the post latching assembly of FIG. 5 in its locked position.
Figure 8:
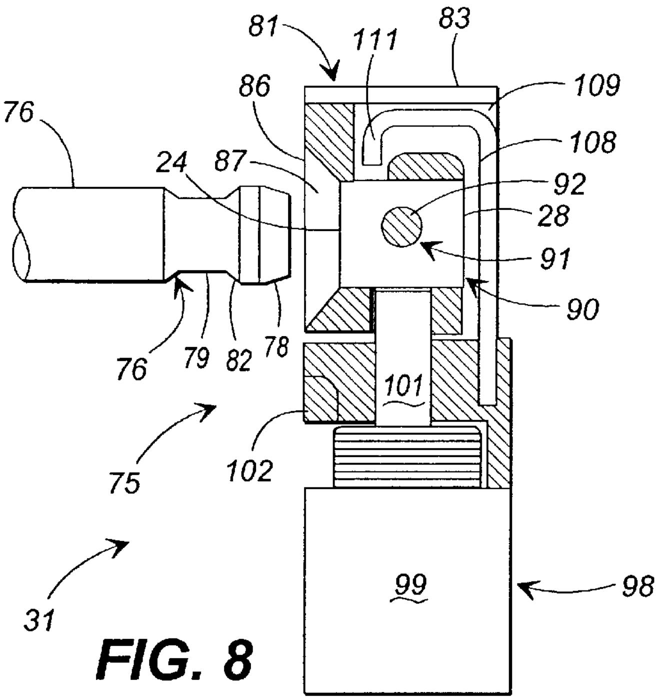
FIG. 8 is a side elevational view of the post latching assembly of FIG. 5 in its raised, unlocked position.
Figure 9:
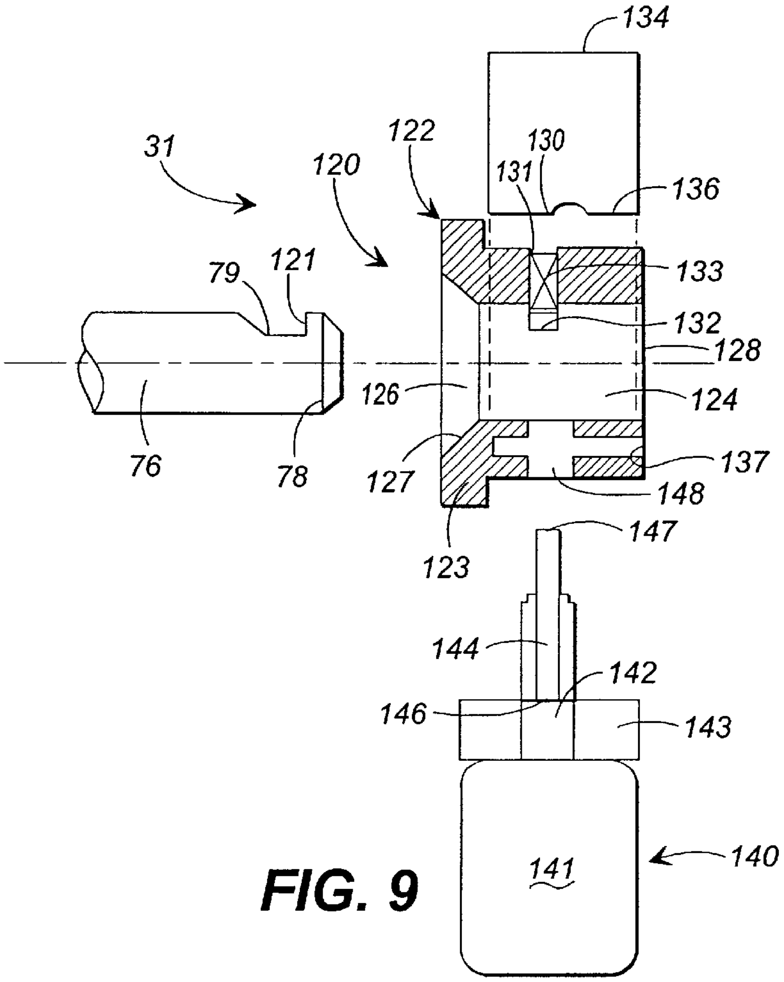
FIG. 9 is an exploded side elevational view taken in partial cross section of an additional embodiment of the post latching assembly of the present invention.
Figure 10:
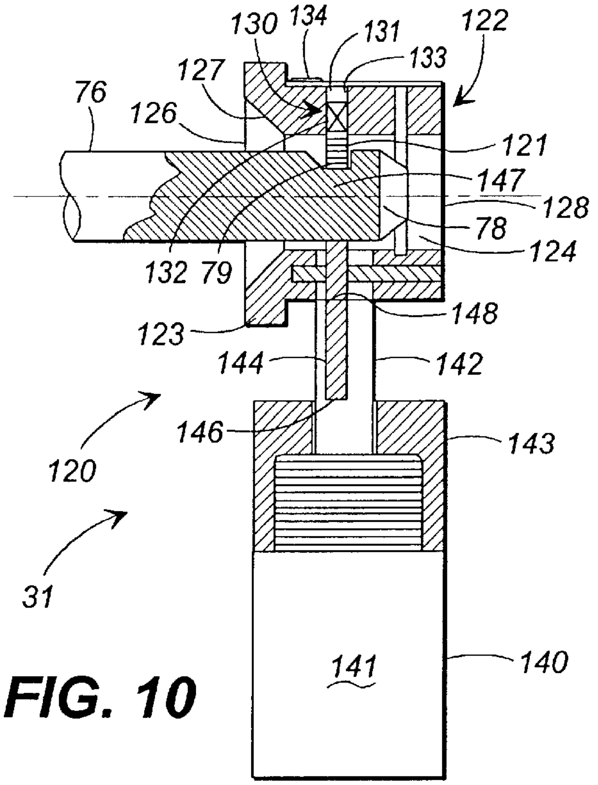
FIG. 10 is a side elevational view, taken in cross section, of the post latching assembly of FIG. 9 with the post locked within the latch housing.
Figure 11:
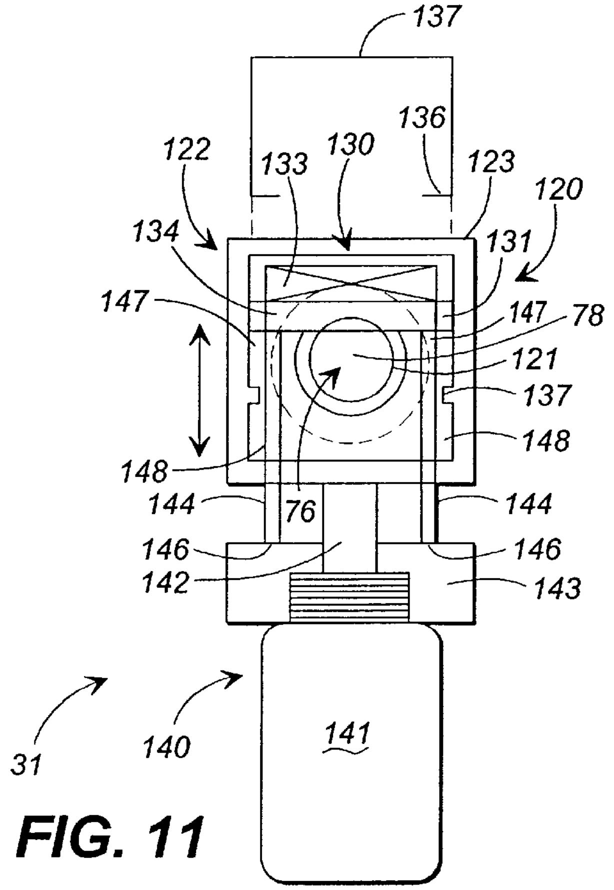
FIG. 11 an end view of the post latching assembly of FIG. 9.

The mechanical latch assembly is shown in various embodiments in FIGS. 5–13, generally illustrated as a post latching assembly 75 (FIGS. 5–8) or 120 (FIGS. 9–11). Each embodiment generally includes a post 76 mounted to the door assembly 14 as shown in FIG. 1, and which generally is an elongated rod formed from a metal such as steel and includes a first, proximal end 77 mounted to the outer door and a second, distal end 78 that projects and is received through the inner door 16, with a notch portion 79 formed adjacent the distal end 78. A latch 81 (FIG. 5), 122 (FIG. 9), is mounted to the enclosure frame in a position to receive the post in locking engagement therewith as the door assembly is moved to a closed position adjacent the enclosure frame.

Figure 5:
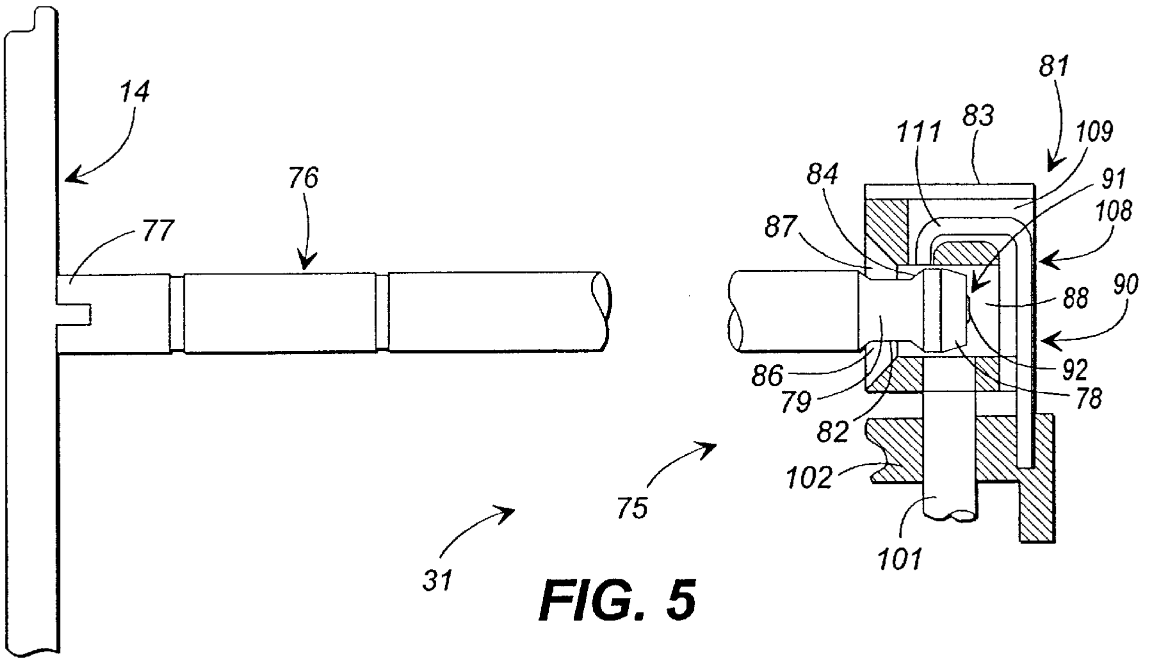
FIG. 5 is a side elevational view of a first embodiment of a mechanical latch assembly with solenoid actuator for use as part of the electromechanical latching apparatus.
Figure 6:
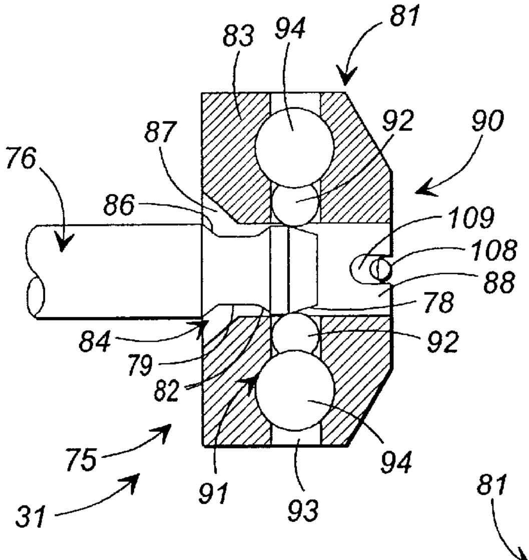
FIG. 6 is a top plan view, taken in partial cross section, of the post latching assembly of FIG. 5 as the post is entering the latch housing.

A first embodiment of the post latching assembly 75 is illustrated in FIGS. 5–8. In this embodiment, the post latching assembly generally includes a latch 81, and the notch portion 79 of the post 76 generally is formed as a recessed groove or area of reduced diameter having a post clamping surface 82. The latch 81 generally includes a latch housing 83 typically formed from a metal material such as aluminum or steel and which includes an axial passage 84 formed approximately centrally therethrough. The axial passage 84 includes a first or front end 86 in which the post is received as indicated in FIGS. 5–7 which has a beveled outer portion 87 to aid in locating and guiding the end of the post into the axial passage, and a second, open end 88 formed at the rear of the housing. A retaining mechanism 90 is positioned within the housing along the axial passage for engaging and locking the post within the latch housing.

As shown in FIGS. 6 and 7, the retaining mechanism 90 includes a detent assembly 91 is positioned within the housing 83. The detent assembly 91 generally includes a pair of holding balls 15 or bearings 92 that are received and are movable along horizontally extending holding ball passages 93. The holding balls are movable toward and partially into the axial central passage 84 so that in a first, engaging or locking position, the holding balls project inwardly into the axial passage for engaging the clamping surface 82 of the post 76 as indicated in FIGS. 6 and 7. A pair of back stop balls or bearings 94 are positioned within the housing on the opposite sides of the holding balls 92 from the axial passage 84. The back stop balls are received within and are movable along vertically extending back stop ball passages 96. Biasing elements such as springs 97 are received within the vertically extending back stop ball passages 96 and engage and bear against the back stop balls 94 to urge the back stop balls downwardly into a lowered, locking position and in engagement with the holding balls 92. In response, the holding balls are urged inwardly into engagement with the clamping surface 82 of the post 76 (FIG. 7) for locking the post within the latch housing 83.

As illustrated in FIGS. 7 and 8, an actuator 98 such as a solenoid 99 is mounted to the bottom of the latch housing 83.

The solenoid 99 generally is a 24 volt solenoid having an approximately 0.9 ohm resistance and includes a plunger 101 mounted to the housing 83 so that as the solenoid is actuated and retracts the plunger, the solenoid is pulled toward the housing. A pusher pad or plate 102 is mounted at the upper end of the solenoid and typically is an elongated pad or plate that extends outwardly with a width slightly less than the width of the housing. As illustrated in FIG. 7, a pair of lift pins 103 are mounted to the pusher pad adjacent the outer edges thereof and are movable with the pusher pad to and through the housing as the pusher pad is raised with the actuation of the solenoid. The lift pins typically are formed from a metal such as steel or similar material and each include a first end 104 attached to the pusher pad and a second end 106 that is received and moves along a lift pin guide passage 107 formed within the housing and extending vertically from the bottom of the housing into the back stop ball passages 96 as illustrated in FIG. 7. As the lift pins are raised the actuation of the solenoid, they engage and urge the back stop balls upwardly against the force of the springs 97, which in turn releases the holding balls from their locking engagement with the post.

In addition, as shown in FIGS. 5 and 8, a release member or bar 108 is mounted to the pusher pad and extends upwardly through a slot 109 or groove formed in the latch housing 83. The release member 108 generally is formed firm a metal and includes a hooked or downwardly projecting portion 111 that is extended downwardly through the housing and into the axial center passage 84 as he post is received within the housing. The hooked portion 111 of the release member 108 is engaged by the distal end 78 of the post 76 as the post is received within the housing, causing the solenoid and pusher pad to be raised. As a result, the pusher pins 103 (FIG. 7) are moved into engagement with and urge the back stop balls out of engagement with the holding balls to release the holding balls from their locked position to enable the post to enter the latch housing as illustrated in FIG. 8. Additionally, as the pusher pad is raised toward the housing upon actuation of the solenoid, the release member 108 correspondingly is raised out of engagement with the post as the post is moved out of the latch housing. As the post is released from locking engagement with the holding balls, the post generally is urged out of the latch housing by the biasing force exerted upon the enclosure frame and door assembly by the resilient sealing gasket material 18 (FIG. 1) applied between the door assembly 14 and the enclosure 11. This inherent resiliency in the gasket material typically is sufficient to enable the door assembly to be moved a sufficient distance to disengage the post from the latch housing upon release of the post from its locking engagement and thereafter enable the operator to move the door to a fully opened position displaced from the enclosure frame.

An additional embodiment of the post latching assembly 120 is illustrated in FIGS. 9–11. In this embodiment, the notched portion 79 of the post 76 is formed as a square notch having a vertically extending post engaging or clamping surface 121. The post latching assembly 120 includes a latch 122 having a housing 123 generally formed from a metal material such as aluminum or steel or similar high strength durable material. The latch housing 123 includes an axial passage 124 extending approximately through the center of the housing and including an open or front end 126 having a beveled edge or surface 127 formed there about for ease of locating and guiding the distal end of the post 76 into the axial passage 124, and a second open end 128 formed at the rear of the housing as shown in FIGS. 9–11.

A retaining mechanism or element 130 (FIGS. 9 and 11) is mounted within the latch housing, positioned within a groove or slot 131 that extends from the top of the housing downwardly through the housing and partially into the axial passage 124. The retaining element generally includes a locking bar 132 or rod, typically formed from a metal such as steel, or similar durable material, that extends laterally across the width of the housing. A spring 133 or similar biasing element is positioned above the retaining element and tends to urge the retaining element or locking bar downwardly to a lowered, engaging position in which the locking bar is received and held in engagement with the post clamping surface 121 of the notch 79 of the post 76, as shown in FIG. 10. A cover plate 134 (FIGS. 9 and 11) is received over and engages the housing 142 to enclose the upper end of the slot 131. The cover plate 134 generally is formed from a sheet metal material or similar material and includes a pair of inwardly projecting flanges 136 that engage slots or grooves 137 formed in the sides of the housing 123.

An actuator 140 is mounted to the bottom of the latch housing 123 and typically includes a 24 volt solenoid, indicated at 141, having an approximately 0.9 ohm resistance. The solenoid 141 includes a plunger 142 that is mounted to the latch housing so that as the solenoid is actuated and retracts its plunger, the solenoid is pulled upwardly toward the latch housing. A pusher pad or plate 143 is mounted about the upper end of the solenoid 141 so as to be movable therewith. A pair of guide pins or rods 144, typically formed from a metal material, are mounted to the pusher pad so as to be movable therewith as the solenoid is retracted toward the latch housing 123. The guide pins are mounted to the pusher pad at first ends 146, while their second ends 147 extend upwardly through the guide passages 144 formed in the latch housing 122 that extend through the housing from the bottom surface thereof, into the slot 131 formed adjacent the top of the housing.

As the guide pins are raised with the actuation of the solenoid, the second or upper ends 147 of the guide pins 144 engage the opposite ends of the locking bar and urge the locking bar upwardly out of engagement with the notch of the post to release the post from locking engagement within the latch housing. As the retaining element is moved out of locking engagement with the notched portion of the post, the inherent resilience of the flexible sealing gasket 18 (FIG. 1) mounted to the door assembly 14 of the enclosure 11 generally is sufficient to urge the door slightly away from the enclosure frame to move the post out of the latch housing and enable the operator to thereafter move the door to its fully opened, unlocked position displaced from the enclosure frame 13 for access to the interior of the enclosure.

Figure 12:
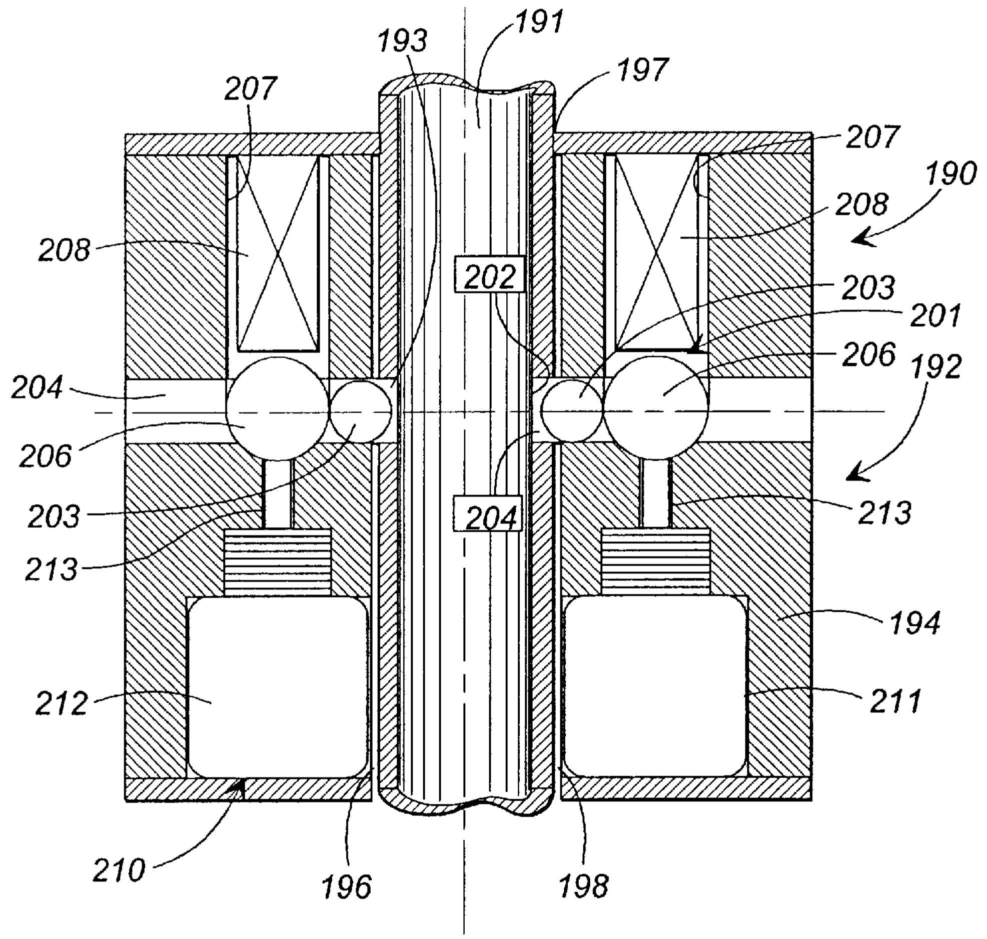
FIG. 12 is a side elevational view taken in cross section of a further embodiment of the post latching assembly of the present invention.
Figure 13:
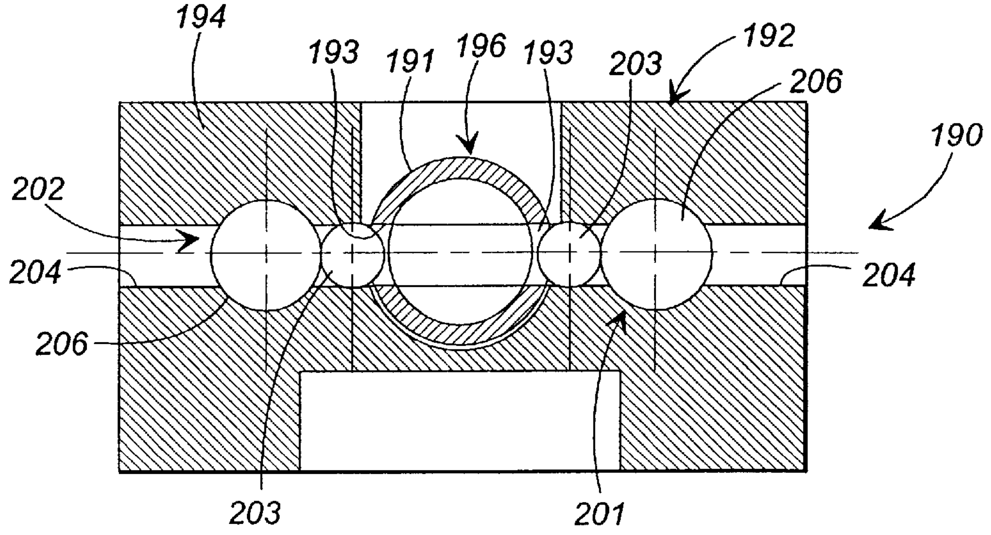
FIG. 13 is a top plan view taken in cross section of the post latching assembly of FIG. 12.

A further embodiment of a latching assembly, indicated at 190, is illustrated in FIGS. 12 and 13. This embodiment of a latching assembly 190 generally is designed for use with latching systems for trailers or similar assemblies which include an elongated shaft or linkage 191 that extends and is rotatable and is movable vertically through a latch 192. The post or shaft 191 (FIG. 12) generally includes a recessed notch or groove 193 formed along the portion of the shaft received within the latch 192. The latch 192 generally includes a housing 194, typically formed from a metal material such as aluminum or steel or similar durable, high strength material, and includes a vertically extending central passage 196 having open upper and lower ends 197 and 198. As illustrated in FIG. 12, a retaining mechanism 201, illustrated as a ball detent assembly 202 is mounted within the housing on opposite sides of the shaft 191.

As illustrated in FIG. 12, the ball detent assembly 202 includes a pair of holding balls or bearings 203 mounted on opposite sides of the shaft 191 and movable along laterally extending holding passages 204 formed through the housing 194. The holding balls 203 are movable along the laterally extending passages 204 between an engaging, locked position and in engagement with the groove 193 formed in the shaft 191, as illustrated in FIGS. 12 and 13, and a nonengaging, unlocked position displaced from the groove 193 of the shaft 191 to enable the shaft to be rotated and/or moved longitudinally through the housing. A pair of back stop balls or bearings 206 are mounted at the outer ends of the holding ball passages 204 engage and urge the holding balls 204 toward the central passage, and maintain the holding balls into locking engagement with the groove of the shaft. The back stop balls 206 are received within and are movable along vertically extending back stop ball passages 207 (FIG. 12) formed along the sides of the housing. Biasing elements 208 such as compression springs are mounted within the back stop ball passages 207 above the back stop balls and tend to engage and urge the back stop balls downwardly into engagement with the holding balls, which in turn forces the holding balls laterally along the holding ball passages toward engagement with the shaft 191 as illustrated in FIG. 12.

An actuator assembly 210, here illustrated as including a pair of solenoids 211 and 212 are mounted within the housing 194, aligned with the back stop ball passages 207. Each of the solenoids generally is a 24 volt solenoid having an approximately 0.9 ohm resistance and includes a plunger 213 that is extensible therefrom. The plunger 213 of each solenoid 211 and 212 is extensible through the housing and along the lower portions of the back stop ball passages 207 (FIG. 12) and into engagement with the back stop balls. As the solenoids are actuated, generally simultaneously, the solenoids extend their plungers into engagement with the back stop balls and urge the back stop balls upwardly along the passages 207 against the force of the biasing elements 208 to release the back stop balls from engagement with the holding balls. As a result, the holding balls are permitted to move outwardly along their holding ball passages and the shaft is thus released from locking engagement with the holding balls so as to be freely movable along the latch 192. Once released, the operator can rotate and/or raise or lower the shaft as needed to fully unlock and open of the door of the enclosure for access to the interior of the enclosure.

OPERATION

Figure 14:
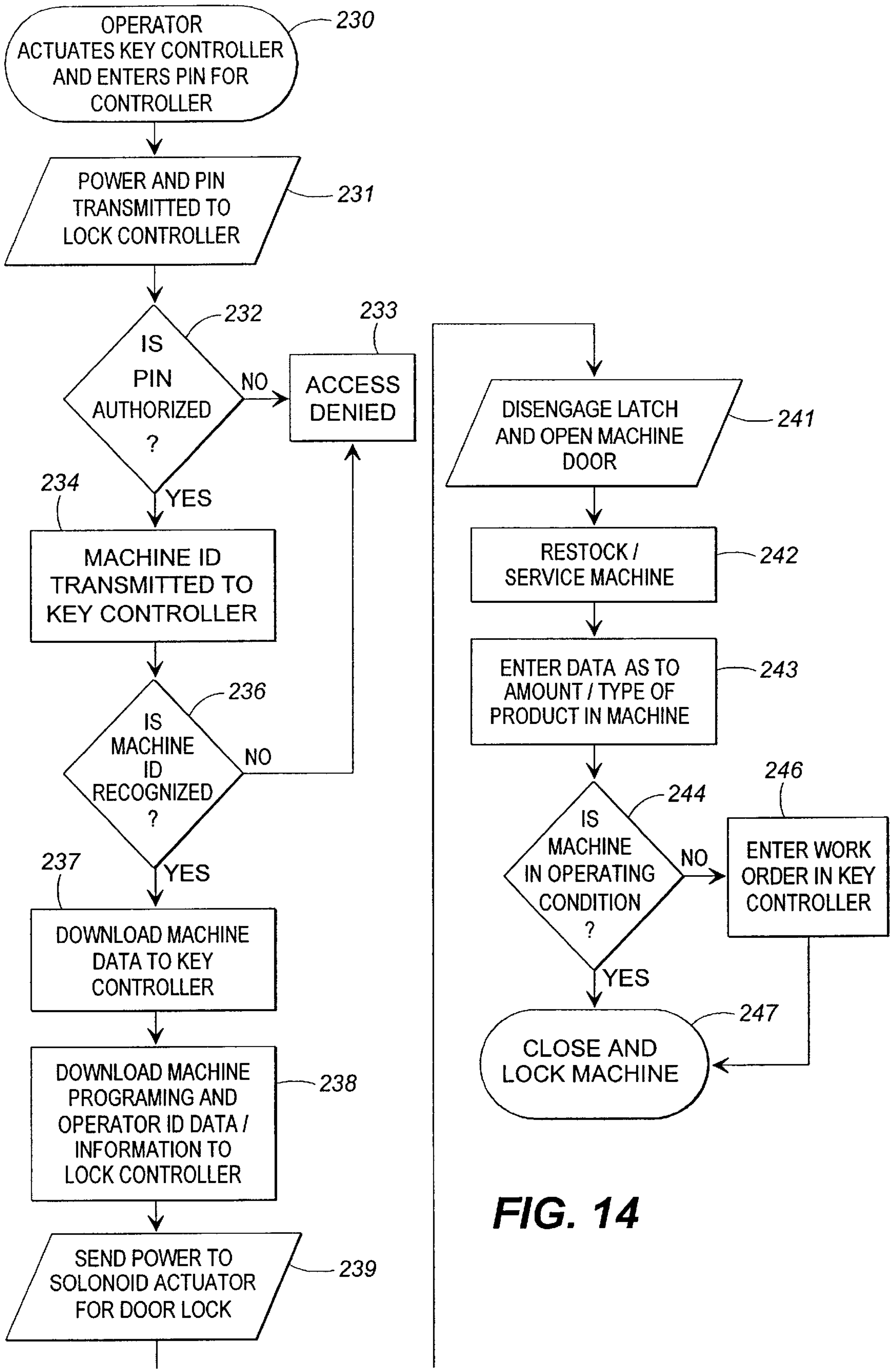
FIG. 14 is a flow chart illustrating the operation of the electromechanical latching apparatus of the present invention.

The operation of the electronically operated latching assembly 10 is generally illustrated in FIGS. 4A, 4B and 14. As shown in FIG. 4A, prior to use, the key controller is initially programmed from a central processor or server computer 63 with information including route information identifying a particular set of machines to be accessed by the key controller, identifying the beginning inventory of products being sent out with the service technician or operator, setting the clock within the key controller, to match that of the lock controllers of the machines to be accessed and programming the key controller with a personal identification number (PIN) for accessing the desired machines. In addition, any necessary programming updates for the machines to be accessed also generally are programmed into the key controller. The battery or other power source of the key controller further is fully charged as illustrated in FIG. 4A. Once the key controller 50 has been fully programmed and its battery charged, the user or service technician is able to access a desired series of machines or enclosures for restocking and servicing.

As illustrated in FIG. 1, for operation of the electronically operated latching assembly for opening a desired machine or enclosure, the user first places the key controller on the outer door 19 of the door assembly 14 of the enclosure 11 in registry with the data/power link 45 mounted to the rear surface of panel 22 of the outer door 19 adjacent a comer of the frame 21 of outer door. Typically, the data/power link will be positioned at a corner of the door frame so that the key controller can be slid into the comer and into engagement with the door frame 21 on the front side of the door 19 to automatically locate and place the inductive coupling or link of the key controller 50 in registry with the inductive coil of the data/power link 45. It is also possible to provide indicators on the decorative front panel 22 of the outer door 19 for aiding the locating of the key controller in registry with the data/power link and/or to allow the data/power link to be positioned at various points about the inner door as desired, Once the key controller is properly positioned opposite the data/power link 45, the operator, such as a service technician or "route-man", can initiate an opening or unlocking operation as illustrated in FIG. 14.

As shown in FIG. 14, as a first step 230, the operator actuates the key controller by closing the switch 54 (FIG. 3) and, if necessary, enters the personal identification number for the controller through the key pad and display 58 and 57 (FIG. 3A). Upon actuation of the key controller, power from the battery of the key controller is transmitted inductively through the door across an air gap to the mating data/power link and to the lock controller to energize the data/power link and lock controller, after which the PIN of the key controller is transmitted through the data/power link to the lock controller as illustrated in step 231. The lock controller in step 232 checks the PIN number of the key controller against a programmed list or set of authorized PIN numbers stored within the memory of the lock controller. If the PIN number is not found to be an authorized identification number, access is denied as indicated at 233. If the PIN number is recognized as being an authorized identification number, the particular machine identification is transmitted to the key controller as indicated at 234. The key controller then checks to see if the machine is a recognized machine that is to be accessed during this particular service call by the key controller, as illustrated at 236 and if not, access to the machine is denied.

If the machine ID is recognized as a machine that is to be accessed during the particular service call, a response signal is sent to the lock controller verifying the machine ID and in turn the lock controller downloads data concerning the operation of the machine, such as the time and dates that the machine has been accessed and by whom as well as potential fault conditions detected by the machine controller as shown in step 237. Thereafter, in step 238 the key controller downloads machine programming and operator identification data and information to the lock controller to provide programming updates to the machine and create a record of the date, time and by whom the machine has been accessed. After the transfer of machine data and programming and operation identification data between the key controller and lock controller, the lock controller sends an approximately 40 to 50 volt signal or power pulse, as indicated at step 239, to the actuator, i.e., solenoid 99 (FIG. 7) or 141 (FIGS. 9–11) for the mechanical latch assembly 31. This power signal causes the plunger 101 (FIG. 7) or 142 (FIG. 10) of the solenoid to be retracted such that the solenoid and its pusher pad 102 (FIG. 7) or 143 (FIG. 10) are raised toward the latch housing.

As the solenoid and pusher pad are raised toward the latch housing, as shown in FIGS. 7 and 10, the lift pins 103 (FIG.

7) or 144 (FIG. 11) are urged upwardly through the latch housing along lift pin guide passages. In the first embodiment 75 of the post latching assembly, the lift pins engage back stop balls 94 (FIG. 7) of a detent assembly within the latch housing and urge the back stop balls upwardly and out of engagement with a pair of holding balls 92. The holding balls are thus released from their locking, engaging positions projecting into the axial center passage of the latch housing, while at the same time, the release member is moved away from the post, so that the post 76 of the mechanical latching assembly 31 is released from engagement with the latch housing 82. Similarly, in the second embodiment of the post latching assembly 120 (FIGS. 9 and 11), as the left pins 144 are raised, they engage and urge the locking bar 132 upwardly against the spring 133 and out of engagement with the clamping surface 121 of the post 76 to release the post from the latch 122. Once the post has been released from the latch, the inherent resiliency of the sealing gasket material 18 (FIG. 1) applied about the inner door 16 of door assembly 14 of the enclosure generally will cause the door assembly to be urged away from the frame 13 of the enclosure 11 a sufficient distance to move the post free of the latch housing. The operator or service technician can then swing or move the door further outwardly to its fully opened position for access to the enclosure.

In use of the third embodiment of the post latching assembly 190 shown in FIGS. 12 and 13, the lock controller sends a power signal or pulse to each of the solenoids 211 (FIG. 12) which causes the plungers 213 of the solenoids to be extended. As these plungers 213 are extended, they engage and urge back stop balls 206 upwardly against the force of biasing elements 208 so as to move the back stop balls out of engagement with holding balls 203. As a result, the holding balls are released from their engaging position illustrated in FIGS. 12 and 13 so as to release the holding balls from locking engagement with the groove 193 formed in the shaft 191. Once released, the operator can rotate and thereafter raise or lower the shaft through the latch housing 194 to unlock the door of the enclosure, such as a truck trailer, to enable the door to be opened for access to the enclosure.

Once the machine/enclosure door(s) have been opened, the operator can restock or unload the machine/enclosure or can perform any needed servicing of the machine/enclosure components shown in step 243 (FIG. 14), the operator thereafter enters data into the key controller as to the types and amount of product stocked in the machine so as to provide a record of how much product was previously used or dispensed by the machine to check against the machine receipts and for inventory control. As shown at 244, the operator further checks to see if the machine is in operating condition, and if not, he or she enters a work or repair order, shown at 246 to the key controller. After the work order has been entered into the key controller or if no repair/work order is required, the operator closes the doors and re-engages the mechanical latch assembly as a final step 247.

After the operator has completed all of his service calls for the day, week or other time period, the information recorded in the hand held key controller from each machine services by the operator is downloaded to the central processor or server unit 63 as indicated at FIG. 4B. For example, information as to the machines serviced and the amount of inventory dispensed into each machine is downloaded to the central computer unit and can be checked against the beginning and ending inventory sent out with that particular operator. In addition, any work or repair orders and machine specific information, such as who had accessed the machines, when such access was made, as well as information regarding how long each service call took for a particular machine or set of machines also can be downloaded and reported. This information in turn can be used to run reports such as security, sales and/or service reports to enable closer monitoring and more detailed information to be generated regarding how much product is being dispensed from certain machines or groups of machines so as to indicate the frequency at which such machines need to be serviced and average service times for such machines for better or more efficient planning of service routes and calls.

Figure 15:
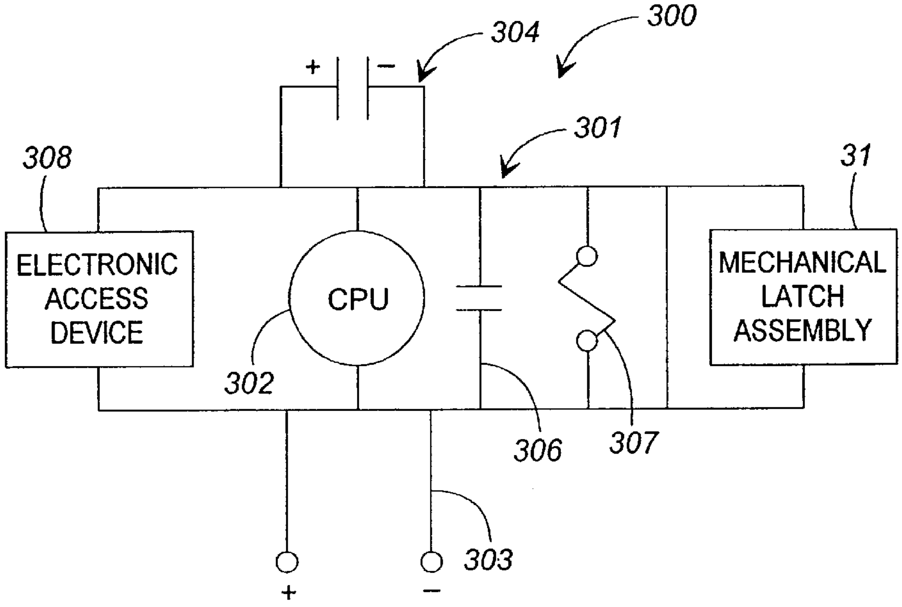
FIG. 15 is a schematic illustration of an additional embodiment of a lock control assembly for disengaging the post latching assemblies of FIGS. 5–13.

A further embodiment of the electronic lock control system of the electromechanical a latching apparatus for controlling the actuation of the post latching assemblies discussed above and as illustrated in FIGS. 5–13, is schematically illustrated in FIG. 15. As illustrated in FIG. 15, this additional embodiment of the electronic control system, indicated generally by 300, generally includes an electronic controller 301 similar to the lock controller 50 (FIG. 2) as discussed above, for controlling the actuation and disengagement of the mechanical latch assembly 31. The lock controller 301 (FIG. 15) includes a processor 302, which typically is a 64 to 128 bit microprocessor chip or board having internal memory and an internal clock. In this embodiment, the lock controller further is connected to a direct, constant power source, indicated at 303, such as the power source for the vending machine or enclosure being secured with the electromechanical latch assembly. In addition, a back-up battery 304 generally is provided for the lock controller, and typically comprises an approximately 12 volt, 1.5–2 amp battery, which provides back-up power to the lock controller 301 in the event that the direct power supply 303 is interrupted.

The lock controller 301 further includes a capacitor 306 and a relay 307 for transmitting a power signal or pulse to the actuator of the mechanical latch assembly 31. An electronic access device 308 generally is mounted to the front of the door assembly for the machine/enclosure and is connected to the lock controller 301. The electronic access device generally can include a variety of different types of access devices such as card swipe readers, proximity card readers which read an access card carried by the operator or service technician, a touch or key pad in which an access code generally is entered by the service technician or operator, a receiver unit which can receive signals, including access information, from a remote control unit carried by the service technician or operator, or a key assembly which sends an access control signal to the processor 302 of the lock controller 301 when a key in inserted and turned to indicate that the machine or enclosure has been accessed for disengaging the mechanical latch assembly to enable opening of the machine/enclosure.

Typically, in use with such a system, the operator or service technician engages the electronic access device such as by swiping an access card through a card swipe reader or proximity sensor, or by inputting or transmitting an access code or identification code. The electronic access device transmits the access or identification information for the operator to the lock controller 301. This access information is compared with stored identification or access codes stored within the processor 302 of the lock controller. If the inputted access or identification code is not recognized as being authorized, access to the machine or enclosure is denied. If the inputted access or identification code is recognized as authorized to access the enclosure, a power signal is generated in the capacitor 306 and is transmitted by the processor 302 through the relay 307 to actuate the solenoid or other actuator of the mechanical latching assembly 31. As the solenoid of the mechanical latch assembly 31 is actuated, the post for the mechanical latch assembly is released from engagement within the latch housing to release the door assembly from its locked, engaging position against the enclosure frame. Thereafter, the operator or service technician can move the door to its fully opened position for servicing the machine/enclosure. After servicing, the service technician closes the door with the post being received within the latch to secure the door in a locked position.

The present invention thus provides more enhanced security of enclosures such as vending machines, ATMs or similar types of enclosures by providing an electronically operated latching assembly through which access to the machines/enclosures can be tightly controlled, and which further enables information regarding the servicing of such machines/enclosures to be monitored and reported to enable businesses to service such machines/enclosures more efficiently and to reduce or minimize down time and losses.

It will be understood by those skilled in the art that while the foregoing invention has been disclosed with reference to preferred embodiments or features, various modifications, changes and additions can be made to the foregoing invention, without departing from the spirit and scope of the invention as set forth in the following claims.

What is claimed is:

1. A latching assembly for securing a door against a door frame, comprising:

a post mounted to the door;

a latch mounted to the frame in a position to be engaged by said post as the door is moved toward a closed position against the frame and including a retaining element for engaging and holding said post within said latch, said retaining element being movable between a locked position in engagement with said post and an unlocked position displaced from said post for enabling said post to be released to enable said door to be moved to an open position away from the frame, wherein said retaining element comprises at least one holding ball of a detent assembly that further includes at least one back stop ball which urges said at least one holding ball into engagement with said post for holding said post in a locked position within said latch, and a biasing element positioned to engage and urge said back stop ball against said holding ball;

an electronic lock control;

a key controller for supplying power to said lock control in a contact-free manner through a surface of the door and across a gap for energizing said lock control from outside the door; and an actuator for moving said retaining element from its locked position to its unlocked position for releasing said post from said latch in response to energizing of said lock control and permitting the door to be moved to an open position displaced from the frame without the use of a mechanical key and tumbler lock mechanism.

2. The latching assembly of claim 1 and wherein said actuator includes a solenoid having a plunger connected to said housing and at least one lift pin engaging said back stop ball to urge said back stop ball from engagement with said holding ball.

3. The latching assembly of claim 1, wherein the key controller is capable of supplying control signals to said lock control in a contact-free manner through the surface of the door and across the gap.

4. The latching assembly of claim 1 and wherein as the holding ball holds the post in its locked position, the back stop ball completely obstructs linear movement of the holding ball away from the post in a direction perpendicular to a length of the post.

5. The latching assembly of claim 1 and wherein said electronic lock control comprises:

a latch controller for controlling the release of said retaining element, and a data/power link capable of receiving control signals and power signals indirectly through the door and transmitting the received power and control signals to said latch controller for energizing said latch controller to cause the release of said retaining element.

6. The latching assembly of claim 5 and wherein said data/power link comprises an RF link, and wherein said key controller comprises a hand held RF transmitter for transmitting an RF pulse signal containing control signals across a desired distance to said lock control, and wherein said key controller includes a power source for powering said lock control.

7. The latching apparatus of claim 5 and wherein said data/power link comprises an infrared link, and wherein said key controller comprises a hand held infrared transmitter for transmitting an infrared pulse signal containing control signals across a desired distance to said lock control, and wherein said key controller includes a power source for powering said lock control.

8. The latching assembly of claim 5 and wherein said key controller includes a portable power source and means for inductively transmitting power and control signals through the surface of the door and across said gap to said data/power link.

9. The latching apparatus of claim 8 and wherein said lock controller and said key controller include software for recording access information transmitted in response to actuation of said key controller and for restricting access to the enclosure upon receipt of nonconforming-access information.

10. A latching assembly for securing a door against a door frame, comprising:

a post mounted to the door;

a latch mounted to the frame in a position to be engaged by said post as the door is moved toward a closed position against the frame and including a retaining element for engaging and holding said post within said latch, said retaining element being movable between a locked position in engagement with said post and an unlocked position displaced from said post for enabling said post to be released to enable said door to be moved to an open position away from the frame, said series of retaining elements each comprising a holding ball of a pair of opposed ball detent assemblies each of which further includes a back stop ball urging said holding ball toward engagement with said post and a biasing element for urging said back stop ball in engagement with said post for locking said post within said latch;

an electronic lock control;

a key controller for supplying power to said lock control in a contact-free manner through a surface of the door and across a gap for energizing said lock control from outside the door; and an actuator for moving said retaining element from its locked position to its unlocked position for releasing said post from said latch in response to energizing of said lock control and permitting the door to be moved to an open position displaced from the frame without the use of a mechanical key and tumbler lock mechanism.

11. The latching assembly of claim 10 and wherein as the holding ball is maintained in engagement with the post, the back stop ball completely obstructs linear movement of the holding ball away from the post in a direction perpendicular to a length of the post.

12. A latching apparatus for securing a door to a door frame of an enclosure, comprising:

a latch assembly having a post mounted to the door and a latch mounted to the door frame and positioned to receive said post therein to secure the door to the frame in a locked position;

said latch including a detent assembly having at least one holding ball biased into engagement with said post and a solenoid for disengaging said detent assembly to release said post from engagement therewith;

an electronic lock control system including a lock controller communicating with said latch assembly for actuating said solenoid to cause said backstop ball to free said holding ball from engagement with said post and an access control mechanism communicating with said lock controller for energizing and causing said lock controller to actuate said solenoid in response to access information from said access control mechanism; and a portable key controller carried by an operator and capable of transmitting power to said access control mechanism across a gap and through a surface of the enclosure for supplying the power in a contact-free manner to energize said lock controller for actuating said solenoid and permitting the door to be moved to an open position displaced from the frame without the use of an insertable mechanical key and tumbler lock mechanism.

13. The latching apparatus of claim 12 and wherein said detent assembly further comprises a back stop ball biased into engagement with said at least one holding ball for urging said at least one holding ball into a locking position engaging and holding said post within said housing.

14. The latching apparatus of claim 13 and wherein as the holding ball is in its locking position, the back stop ball completely obstructs linear movement of the holding ball away from the post in a direction perpendicular to a length of the post.

15. The latching apparatus of claim 12, wherein the key controller is capable of transmitting control signals to said access control mechanism across the gap and through the surface of the enclosure in a contact-free manner.

16. The latching apparatus of claim 15 and wherein said access control mechanism comprises a data/power link for transferring power and data signals to said lock controller; and said key controller includes a means for transmitting power and data signals to said data/power link in a contact-free manner through the surface of the enclosure to communicate with said controller for causing said latch assembly to be disengaged for opening the door to the enclosure.

17. The latching apparatus of claim 16 and wherein said data/power link and key controller each include an inductive coupling and wherein said key controller further includes a battery.

18. The latching apparatus of claim 16 and wherein said key controller and said data/power link each comprise an RF data link.

19. The latching apparatus of claim 16 and wherein said lock controller and said key controller includes software for recording access information transmitted in response to actuation of said controller and for restricting access to the enclosure upon receipt of nonconforming access information.

20. A method of actuating an electronic latching apparatus securing a door to a frame of an enclosure, comprising:

placing a key controller on a surface of the enclosure;

selectively transmitting power in a contact-free manner from the key controller from outside the enclosure, through the surface of the enclosure and across a gap to a lock controller;

verifying identification of the key controller;

transferring power transmitted from the key controller to an actuator for a latch assembly for the door; and disengaging a retaining mechanism from locked engagement with a post mounted to the door in response to transferring power from the key controller to enable the post to be moved from a latch mounted to the frame for opening the door of the enclosure without using a mechanical key, wherein the step of disengaging a retaining mechanism comprises urging at least one back stop ball of a detent assembly out of engagement with at least one holding ball to release the holding ball from engagement with the post to enable the post to be moved from the latch.

21. The method of claim 20 and wherein the step of selectively Am transmitting power in a contact-free manner from the key controller from outside the enclosure, through the surface of the enclosure and across a gap to a lock controller comprises selectively transmitting power and data signals through the door, in a contact-free manner, from the key controller to a corresponding data/power link that transfers such power and data signals to the lock controller.

22. The method of claim 20 and further including transferring data and programming information between the key controller and lock controller prior to transferring power to the actuator for the latch assembly.

23. The method of claim 20 and further including programming the key controller with data and identification information prior to actuating the lock controller.

24. The method of claim 20, wherein the step of selectively transmitting power further comprises selectively transmitting power and data signals.

* * * * *